United States Patent
Stanzione

(10) Patent No.: US 9,236,721 B2
(45) Date of Patent: Jan. 12, 2016

(54) CONDULET COUPLER

(71) Applicant: Cooper Technologies Company, Houston, TX (US)

(72) Inventor: John Stanzione, Putnam Valley, NY (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 14/325,955

(22) Filed: Jul. 8, 2014

(65) Prior Publication Data

US 2015/0008666 A1   Jan. 8, 2015

Related U.S. Application Data

(60) Provisional application No. 61/843,698, filed on Jul. 8, 2013.

(51) Int. Cl.
*F16L 25/02* (2006.01)
*H02G 3/06* (2006.01)
*H02G 3/08* (2006.01)

(52) U.S. Cl.
CPC . *H02G 3/06* (2013.01); *H02G 3/081* (2013.01)

(58) Field of Classification Search
USPC .......................................... 220/3.8; 285/149.1
See application file for complete search history.

(56) References Cited

U.S. PATENT DOCUMENTS

| | | | | |
|---|---|---|---|---|
| 1,424,443 | A * | 8/1922 | Bissell | 220/3.8 |
| 1,759,365 | A * | 5/1930 | Pearson et al. | 220/3.8 |
| 2,099,918 | A * | 11/1937 | Winter | 220/3.8 |
| 2,199,683 | A * | 5/1940 | White | 220/3.8 |
| 2,498,135 | A * | 2/1950 | Rock, Jr. | 220/245 |
| 2,952,488 | A * | 9/1960 | Appleton | 292/256.73 |
| 3,544,934 | A * | 12/1970 | Poliakoff | 335/206 |
| 4,936,478 | A * | 6/1990 | Bozdeck | 220/3.92 |
| 5,169,013 | A * | 12/1992 | Lammens, Jr. | 220/3.2 |
| RE35,075 | E * | 10/1995 | Lammens, Jr. | 220/3.2 |
| 6,737,575 | B2 * | 5/2004 | Pyron | 174/50 |
| 7,057,104 | B1 * | 6/2006 | McCleskey | 174/505 |
| 7,427,714 | B1 * | 9/2008 | Lammens et al. | 174/66 |
| 8,118,330 | B2 * | 2/2012 | Pyron | 285/149.1 |
| 2007/0289765 | A1 * | 12/2007 | Lammens et al. | 174/50 |

* cited by examiner

*Primary Examiner* — Aaron Dunwoody
(74) *Attorney, Agent, or Firm* — Pearne & Gordon LLP

(57) ABSTRACT

A condulet coupler is provided for attachment to a condulet. The condulet coupler can facilitate tapping into an existing conduit system and reclosing the condulet opening to introduce new conduit runs beginning midstream in an in-place conduit and to introduce splices in an existing run. Other functional changes, such as rerouting select wiring, can also be served by the condulet coupler.

4 Claims, 4 Drawing Sheets

CONDULET COUPLER

CROSS-REFERENCE TO RELATED APPLICATIONS

This application claims the benefit of U.S. Provisional Patent Application Ser. No. 61/843,698, filed Jul. 8, 2013.

FIELD OF THE INVENTION

The present application relates to electrical conduit systems, and more specifically, to a coupler configured to extend a volume of an existing condulet.

BACKGROUND OF THE INVENTION

Various electrical codes require in-conduit wiring for runs emanating from power boxes and terminating at termination points, such as receptacles, in or outside of a building. Commonly, the conduits are filled to about 80% capacity in new construction. These conduits are often installed before the interior of new construction is completed and may also be in place in existing construction—both interior and exterior uses. Not all wiring is used initially, as the intent is to have excess capacity available when needed without the costly need to run additional conduit. Because of the high capacity in a conduit, working in an existing conduit may be space limited.

As a part of the electrical building code, conduit runs include devices called conduit outlet bodies, or condulets, typically placed every 100 feet or less and/or after every third 90 degree bend. These condulets provide access to the embedded wiring and serve as junction points for internal wiring and afford access to embedded wiring if needed. Condulets have removable cover plates and, when the cover plate is removed, the internal wiring is accessible to an electrician, such as to obtain access to wiring for splicing purposes. However, because the wiring remains embedded in the conduit and the available space in the conduit for rewiring may be limited, new wiring to a different portion of the building typically needs to be extended from one of the available ends of the conduit points of connection at either the end near the power box or the distal end, and not from the condulet. In some circumstances, the electrical code requires wiring to be in conduit. Because of the obligation to have wiring in conduit, additional wiring requires laying new conduit from the point of connection and has expense associated with any system down-time, labor, and materials of the installing the new conduit.

BRIEF SUMMARY OF THE INVENTION

To achieve the foregoing and other aspects, a condulet coupler is provided. The condulet coupler includes: a bottom portion having an opening therein; a top portion having an opening therein; a cover configured to close the opening in the top portion; an attachment aperture provided in the bottom portion; and a cover aperture provided in the top portion, wherein the cover aperture is in alignment with a mating aperture in the cover, and wherein the attachment aperture is offset from the cover aperture.

To achieve further aspects, a condulet coupler is provided. The condulet coupler includes: a bottom portion; a top portion; two attachment apertures provided in the bottom portion, the two attachment apertures being separated by a first distance; and two cover apertures provided in the top portion, the two cover apertures being separated by a second distance, wherein the first distance is shorter than the second distance.

To achieve still further aspects, a conduit system is provided. The conduit system includes: a condulet; and a condulet coupler, wherein a top portion of the condulet coupler is secured to a bottom portion of the condulet via a wedge nut fastener.

To achieve still further aspects, a condulet coupler is provided. The condulet coupler includes: a top portion having an opening therein; and a bottom portion having an opening therein; wherein the top portion is devoid of apertures.

DETAILED DESCRIPTION OF THE INVENTION

Example embodiments that incorporate one or more aspects of the present invention are described and illustrated herein. These illustrated examples are not intended to be a limitation on the present embodiments. For example, one or more aspects of the condulet coupler system can be utilized in other embodiments and even other types of devices. The embodiments described herein are directed to cost-effectively facilitating mid-stream tap in and to facilitating redirection some of the wiring in an electrical conduit system. The present invention discloses a condulet coupler that can be attached to an in-line conduit outlet body, or condulet.

Condulets can be of any various sizes and shapes depending on the need of the particular electrical conduit system in which they are installed. The diameters of the condulets are typically sized based on the conduit size in the system. A typical condulet is referred to by shape, or type, where the more common ones are "C" types and "T" types. A C-type body is intended for a straight run and a T-type body is intended for a run which takes a 90 degree turn. Typically, these bodies are made of malleable iron, aluminum, polyvinylchloride, plastic, cast aluminum, or cast iron. A cover plate, typically made of the same material as the conduit body or otherwise aluminum or tin, can be unscrewed from the body and reattached using internal screw holes which may be re-used when another device is attached to the conduit body.

A condulet coupler, as described herein, can be coupled to an existing condulet, such as a C-type or T-type body. The condulet coupler can provide advantages in at least three scenarios. The first scenario is for relocating some wires from one conduit to another. In this example, the condulet coupler mitigates the need to run new conduit beginning at a termination point, such as when a new junction near a condulet coupler is needed and the condulet coupler is distal from either end of the conduit.

Another possible scenario is reuse of unused wiring in conduit. Unused wiring may be pulled and redirected to a different use.

Another possible scenario involves splicing. In the event that wire splicing is needed, because the space available in the condulet coupler is limited and a splice might not hold due to the need to squeeze wires with splices into a limited space in the condulet coupler, the condulet coupler affords a code-compliant option. For instance, the available space for the splice roughly doubles because the interior space of the condulet coupler may be used. Here, embedded wiring is not redirected but instead extra space is available for splicing. Because conduit bodies are of different dimensions and materials, the condulet coupler of the present invention can be formed of various materials, intended to match the material of the condulet coupler, and sized to matingly fit the in-place condulet coupler.

Figure 1:
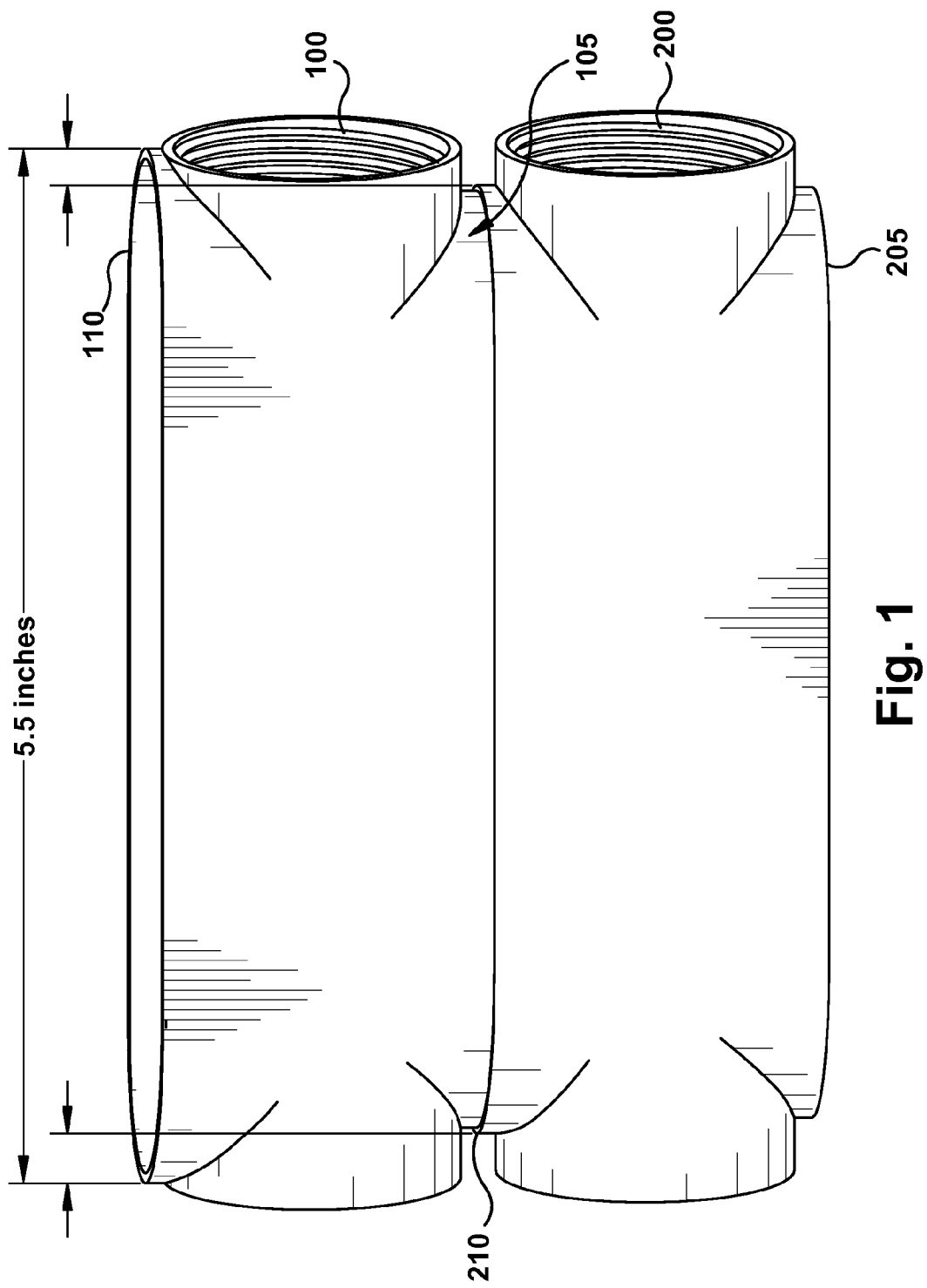
FIG. 1 illustrates a side perspective view of a condulet with an example condulet coupler installed thereon.

Turning now to FIG. 1, a condulet coupler 100 is shown connected to a C-type condulet 200. The condulet 200 includes a bottom portion 205 and a top portion 210, wherein the top portion 210 has an opening (not shown) therein. The opening of the top portion 210 is generally closed by a removable condulet cover (not shown). The condulet coupler 100 includes a bottom portion 105 and a top portion 110. The bottom portion 105 of the condulet coupler 100 is configured to mate with the top portion 210 of the condulet 200. Both the bottom portion 105 and the top portion 110 of the condulet coupler 100 have openings therein, as is shown in greater detail in FIG. 3. However, the top portion 110 of the condulet coupler 100 has a larger opening than the bottom portion 105. In the present example, the top portion 110 of the condulet coupler 100 is longer in length than the bottom portion 105 of the condulet coupler 100. As an example, the opening in the top portion 210 of the condulet 200 and the opening in the bottom portion 105 of the condulet coupler 100 have lengths of about 5.0 inches. Note that one of these openings is sized to fit the corresponding outer dimension therein to provide a fit between the conduit and the condulet coupler. The opening in the top portion 110 of the condulet coupler 100 has a longer length, for example of about 5.5 inches, where both units are commonly centered.

Figure 2:
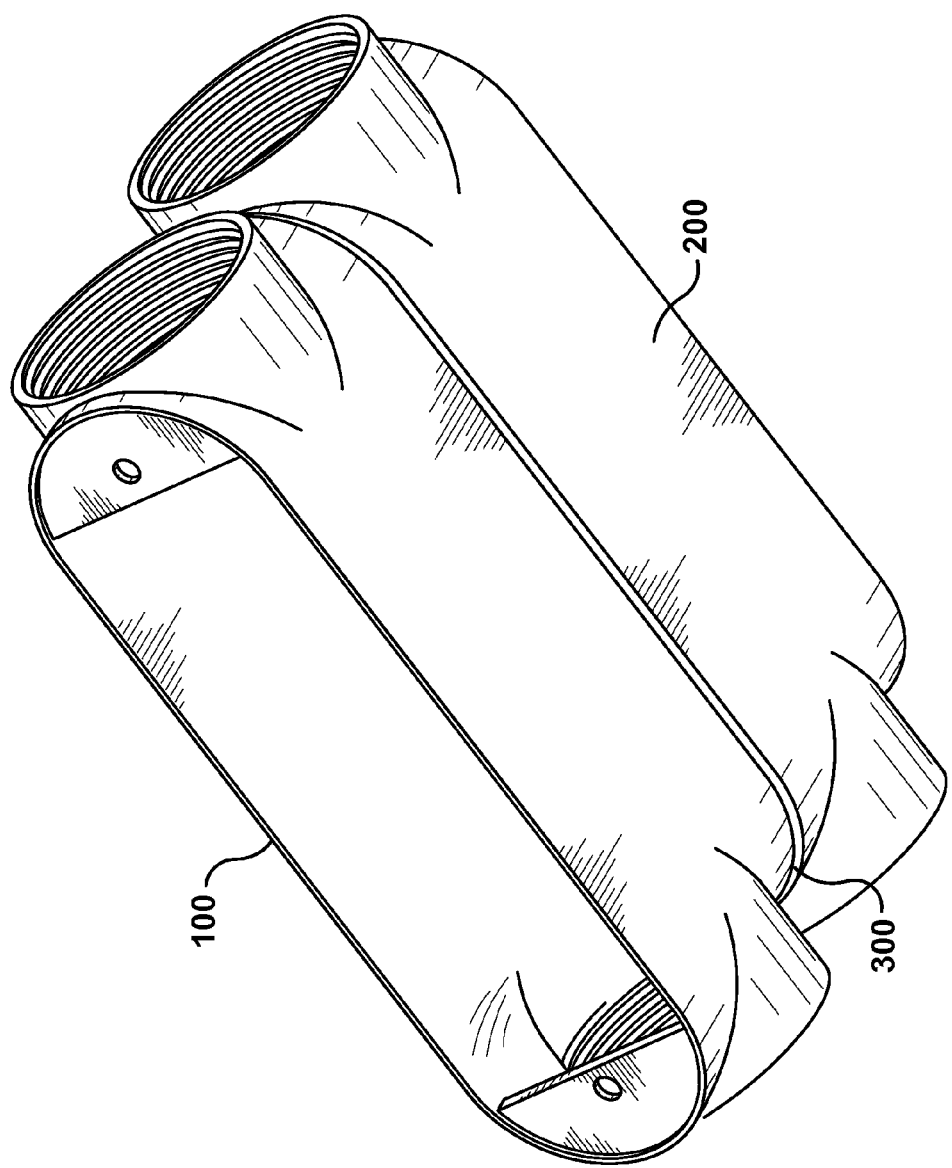
FIG. 2 illustrates a top perspective view of a condulet with an example condulet coupler installed thereon.

FIG. 2 shows the coupling of the condulet coupler 100 with the condulet 200. The bottom of the condulet coupler 100 includes a gasket in the area indicated by reference numeral 300. The gasket is positioned between the condulet 200 and the condulet coupler 100 and is formed of a material which can form a seal between the bodies, such as rubber or silicon. The bottom of the condulet coupler 100 can be friction fit into the condulet 200 with the gasket as an intermediary device, as can be seen in FIG. 2. As an alternative, the top of the condulet 200 may be friction fit into the bottom of the condulet coupler 100.

Figure 3:
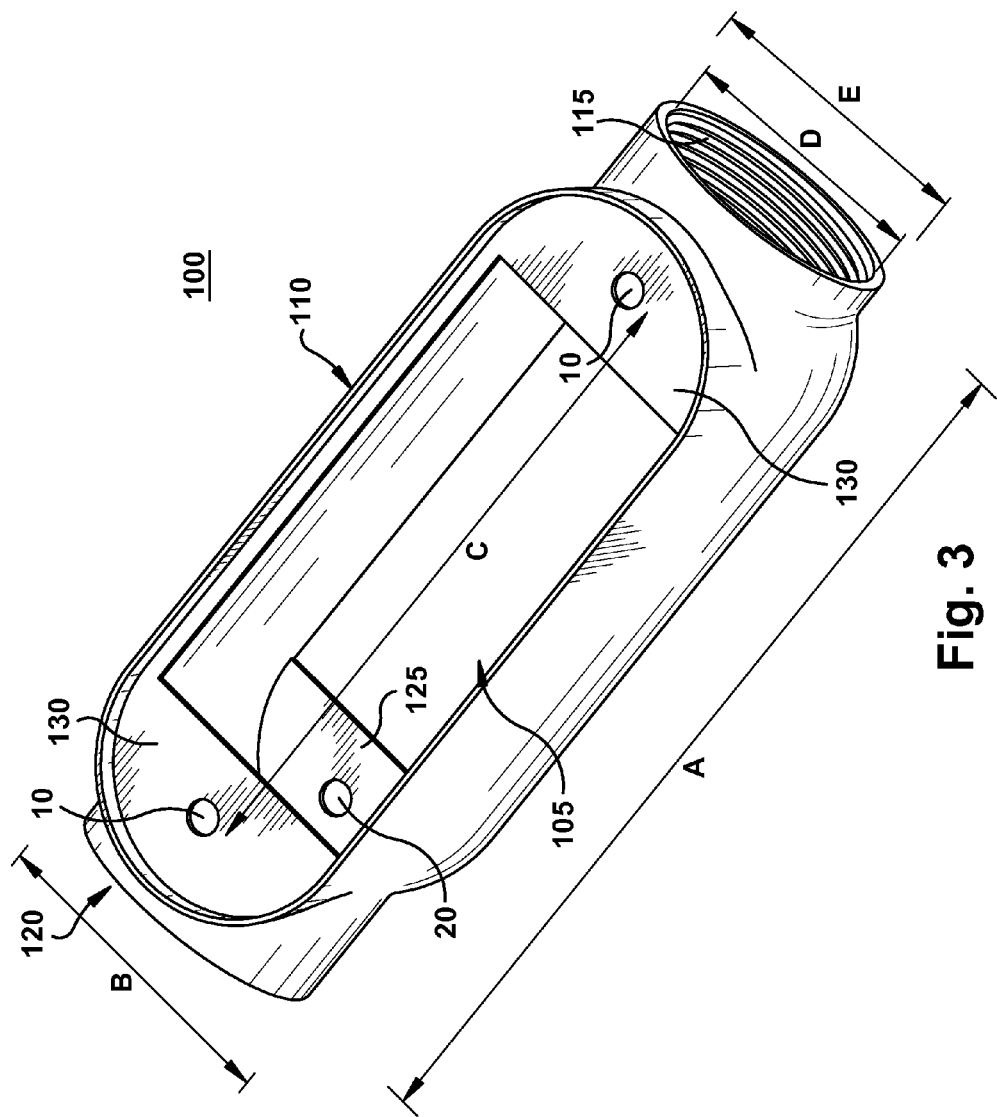
FIG. 3 illustrates a top perspective view of an example condulet coupler.

FIG. 3 depicts an example embodiment of the condulet coupler 100. As can be seen in FIG. 3, a condulet coupler 100 is generally cylindrical with openings at the top 110, bottom 105, and at a forward end 115 and back end 120. The opening at the bottom 105, which is open to the condulet, allows for pulling of wiring for purposes of, for example, restringing through an alternate conduit or wiring. Openings at the forward and back ends 115, 120 are generally circular and threaded for attachment to conduit. If conduit is to extend only in one direction, a cap or cover (typical pipe plug) can be screwed into the unneeded end to seal the opening. The opening at the top 110 is used for access and for placement of a cover, which can be screwed into the condulet coupler 100 as detailed below. Each of the forward and back end openings 115, 120 can also be fitted with a device (not shown) for attaching to alternatively sized conduit (such as a diameter reducer).

The condulet coupler 100 can include at least one attachment aperture 20 provided through a bottom member 125, such as a shelf or plate structure, for further securing the condulet coupler 100 to the condulet 200. Only one attachment aperture 20 and bottom member 125 are depicted in FIG. 3; however, it is to be appreciated that the opposing side of the condulet coupler 100 can include a corresponding attachment aperture and bottom member. A typical fastener can be used to secure the condulet coupler 100 to the condulet 200 via attachment apertures 20 and corresponding apertures provided in the condulet 200. For instance, the fastener can be a screw and the attachment apertures 20 and corresponding apertures can be threaded to receive the screws.

The top portion 110 of the condulet coupling 100 can include at least one top member 130, such as a shelf or stepped portion. The top member 130 includes at least one cover aperture 10, which is used for attaching a cover (such as one shown in FIG. 5) to the condulet coupler 100. As shown in the present example, there can be two cover apertures 10 in the condulet coupler 100. The cover associated with the condulet coupler 100 can be made of the same material as the condulet coupler 100 and includes two mating apertures aligned for attachment to the cover apertures 10 of the condulet coupler 100. Traditional fasteners, such as screws, can be used for attaching the cover to the condulet coupler 100. In the preferred embodiment, cover aperture 10 is threaded. The cover aperture 10 and the attachment aperture 20 at each end of the condulet coupler 100 are offset from one another. For example, the apertures 10, 20 can be offset by about 0.5 inches, with cover aperture 10 being closer to the end. This offset distance permits accessibility of the attachment apertures 20, such as with a screw driver, to facilitate easier installation and removal of the of the condulet coupler 100 to the condulet 200.

Figure 4:
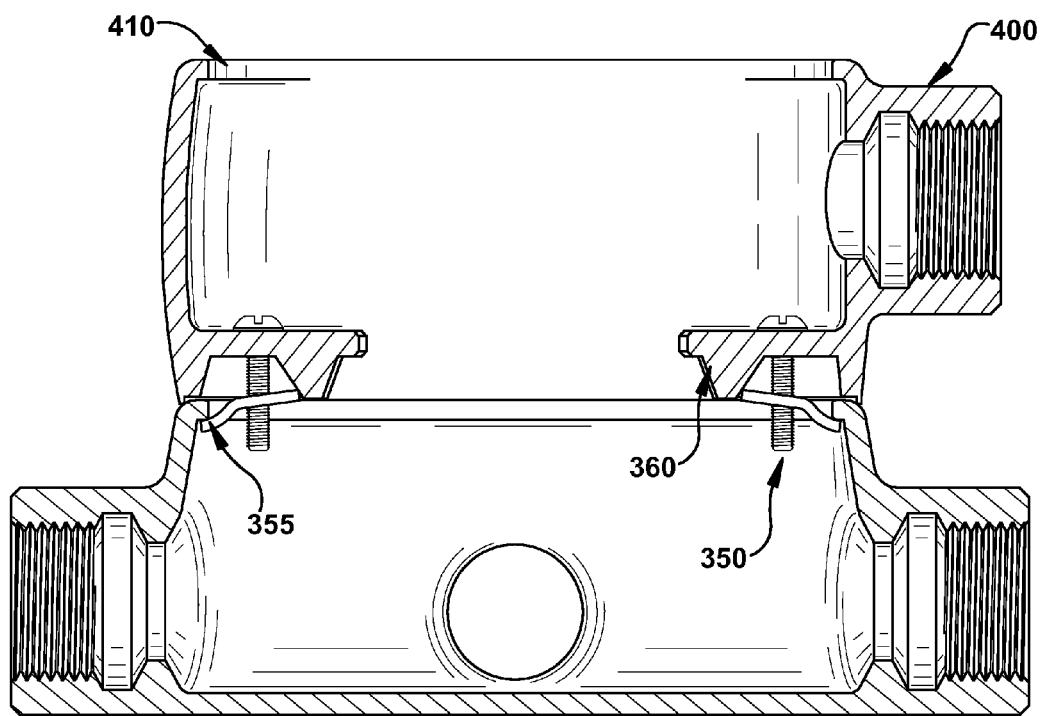
FIG. 4 illustrates a cross sectional side view of a condulet with an example condulet coupler installed thereon.
Figure 5:
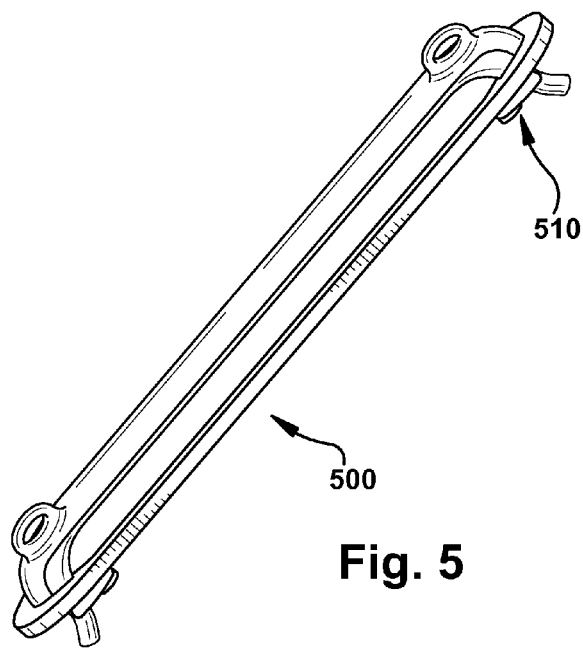
FIG. 5 illustrates a perspective view of an example condulet coupler cover.

FIG. 4 illustrates a cross-sectional side view of another example condulet 300 and condulet coupler 400. In this example, the condulet 300 does not include any apertures in the top portion of the body. Accordingly, a condulet coupler that includes attachment apertures, as shown in the previous example, would not be suitable to use with this condulet configuration. Accordingly, a wedge nut fastener 350 is provided to secure the condulet coupler 400 to the condulet 300. The bottom portion of the condulet coupler 400 includes a projection or flange 360 extending downward from the bottom of the condulet coupler 400. As shown, the wedge nut fastener 350 engages an inwardly extending lip 355 of the condulet 300 at one end and the projection or flange 360 of the condulet coupler 400 at the other end to secure the components 300, 400 together. Likewise, the condulet coupler 400 does not include any cover apertures at a top portion of the body. Instead, the condulet coupler 400 includes an inwardly extending lip 410 at the opening. Accordingly, a condulet coupler cover 500, as shown in FIG. 5, includes at least one wedge nut fastener 510 to secure the cover 500 to the top portion of the condulet coupler 400 in a similar manner.

As will be appreciated, a condulet coupler can be provided in a variety of shapes, sizes, and dimension and is contemplated as falling within the scope of the present invention. FIG. 3 shows example dimensions in terms of alphabetic representations. For instance, the condulet coupler can have the following dimensions: A=5.5 inches, B=1.46 inches, C=4.875 inches, 0=0.93 inches, and E=1.27 inches. A condulet coupler with these dimensions is appropriate for attaching to a C-type 5-inch long condulet with ¾ inch diameter internal space. Similarly, other combinations of dimensions may be used as well, so long as they form a mating seal in the manner described herein or one similar to it. Moreover, modifications and alterations will occur to other upon a reading and understanding of this specification. Example embodiments incorporating one or more aspects of the invention are intended to include all such modifications and alterations.

The invention claimed is:

1. A condulet coupler comprising:
   a bottom portion having a bottom opening therein, wherein the bottom portion is configured to mate with a top portion of a condulet;
   a top portion having a top opening therein, wherein the top opening is larger than the bottom opening;
   a cover configured to close the top opening in the top portion;
   an attachment aperture provided in a bottom plate structure of the bottom portion; and
   a cover aperture provided in a top plate structure of the top portion,
   wherein the cover aperture is in alignment with a mating aperture in the cover, and
   wherein the attachment aperture is offset from the cover aperture.

2. A condulet coupler comprising:
   a bottom portion configured to mate with a top portion of a condulet;
   a top portion;
   two attachment apertures provided in a bottom plate structure of the bottom portion, the two attachment apertures being separated by a first distance; and
   two cover apertures provided in a top plate structure of the top portion, the two cover apertures being separated by a second distance,
   wherein the first distance is shorter than the second distance.

3. A conduit system comprising:
   a condulet; and
   a condulet coupler comprising a bottom portion having a bottom opening therein and a top portion having a top opening therein, wherein the top opening is larger than the bottom opening,
   wherein the bottom portion of the condulet coupler is secured to a top portion of the condulet via a wedge nut fastener, and wherein the wedge nut fastener is configured to contact a protrusion that extends inward from a longitudinal end of the condulet.

4. A condulet coupler comprising:
   a top portion having an opening therein;
   a bottom portion having an opening therein; and
   a cover configured to close the opening in the top portion;
   wherein the top portion of the condulet coupler is devoid of apertures, the bottom portion is configured to mate with a top portion of a condulet, and the cover is configured to attach to the top portion of the condulet coupler via a wedge nut fastener, wherein the wedge nut fastener is configured to contact a protrusion that extends inward from a longitudinal end of the condulet coupler.

* * * * *